(12) United States Patent
Lunde (10) Patent No.: US 7,937,658 B1
(45) Date of Patent: May 3, 2011

(54) METHODS AND APPARATUS FOR RETRIEVING FONT DATA

(75) Inventor: Ken R. Lunde, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1239 days.

(21) Appl. No.: 11/408,603

(22) Filed: Apr. 21, 2006

(51) Int. Cl.
*G06F 17/00* (2006.01)

(52) U.S. Cl. ....................................... 715/269; 715/256

(58) Field of Classification Search .................. 715/269, 715/256, 262, 255, 273
See application file for complete search history.

(56) References Cited

U.S. PATENT DOCUMENTS

| | | | | |
|---|---|---|---|---|
| 4,568,981 A * | 2/1986 | Beaulier | .................. | 348/589 |
| 5,280,574 A * | 1/1994 | Mizuta et al. | .................. | 715/205 |
| 5,519,824 A * | 5/1996 | Lizzi | .................. | 345/170 |
| 5,528,742 A * | 6/1996 | Moore et al. | .................. | 715/205 |
| 5,577,183 A * | 11/1996 | Weyand | .................. | 358/1.15 |
| 5,615,123 A * | 3/1997 | Davidson et al. | .................. | 700/233 |
| 5,727,224 A * | 3/1998 | Tsuji | .................. | 715/259 |
| 5,873,109 A * | 2/1999 | High | .................. | 715/243 |
| 5,875,263 A * | 2/1999 | Froessl | .................. | 382/181 |
| 6,323,864 B1 * | 11/2001 | Kaul et al. | .................. | 345/467 |
| 6,519,630 B1 * | 2/2003 | Hanawa | .................. | 709/206 |
| 6,678,410 B1 * | 1/2004 | Phinney et al. | .................. | 382/181 |
| 6,954,898 B1 * | 10/2005 | Nakai et al. | .................. | 715/262 |
| 7,539,939 B1 * | 5/2009 | Schomer | .................. | 715/269 |
| 2003/0145206 A1 * | 7/2003 | Wolosewicz et al. | .................. | 713/176 |
| 2006/0072136 A1 * | 4/2006 | Hodder et al. | .................. | 358/1.11 |
| 2007/0055934 A1 * | 3/2007 | Adamson, III | .................. | 715/542 |

FOREIGN PATENT DOCUMENTS

JP 04323064 A * 11/1992
JP 10133641 A * 5/1998

* cited by examiner

*Primary Examiner* — Laurie Ries
(74) *Attorney, Agent, or Firm* — Kilpatrick Townsend & Stockton LLP (57) ABSTRACT

A message processor receives message data from a remote source for rendition to a user of a computerized device. The message processor renders the message data to the user and, during rendering of the message data, identifies that a font in which the message data is to be rendered is missing font portions required to fully render the message data in that font. In response, the message processor dynamically obtains the missing font portions for that font to allow the computerized device to fully render the message data in that font.

20 Claims, 6 Drawing Sheets

METHODS AND APPARATUS FOR RETRIEVING FONT DATA

BACKGROUND

Conventional communications devices, such as cellular phones, personal digital assistants, personal computers, laptops and the like, transfer data between one another using various communications protocols and networking technologies. Examples include communications over local area networks "LANs", wireless local area networks "WLANs", cellular phone networks, the Internet, etc.). Generally, such conventional communications devices enable users to transmit information between one another in various formats using a variety of applications, for example, email applications, text messaging applications, instant messaging applications and other such applications involved in data communications. Typically, in transmitting text-based data between conventional communication devices, the data is represented in an encoded numerical or binary format (e.g., American Standard Code for Information Interchange 'ASCII'). For example, a user sending a text message may enter text into his or her device via an input mechanism (e.g., keyboard, stylus, voice recognition software, etc.) and, subsequently, the communications device processes the text data into a numerically encoded data format. The device then transmits this encoded text to a remote device via one or more data communications protocols. Consequently, a conventional communications device receiving the encoded text-based data message then decodes the transmitted data such that the text information can be graphically displayed on the device to a receiving user.

Generally, to decode a message for display as text or other graphical symbols, conventional communication devices maintain a set of graphical representations for characters in a language preferred by a user of the device. For example, the English alphabet has a one-to-one representation between encoded ASCII character data and corresponding graphical symbols (e.g., "A", "B" . . . "Z") used to render or display a visual representation of those characters in a specific font. Thus, a conventional communications device can maintain 26 basic symbols, less punctuation and other ancillary symbols, in order to decode and display encoded text data transmissions. Furthermore, graphical representations of these symbols may have a font family value (e.g., Times, Arial, etc.) associated with the particular character(s) that are being displayed. Each font family, in turn, may comprise various font values that indicate a particular size (e.g., defined as a point size), weight (e.g., light, bold, black, etc.) and orientation (e.g., roman, italic, oblique, etc.). As such, each particular font variation is graphically represented by a "glyph", or a combination of glyphs that have been integrated with one another. The term "glyph" then generally refers to character instances, specific to style and, depending on the format, size. As an example, for the letter "A" in the English alphabet, there may be a different glyph for upper and lower case versions of this letter in each different font that a device can display. However, in ideographically oriented language systems, such as in the Chinese, Japanese and Korean languages, each font family may contain thousands, or tens of thousands, of ideographs or glyphs representing various font values within the font family.

SUMMARY

Conventional communications devices that render readable data for viewing by a user based on font information stored within the device suffer from a variety of deficiencies. In particular, conventional communications devices that store symbol and font data are limited in that these devices cannot dynamically update portions of their symbol and/or font data within the device and are confined to the content of the pre-packaged font sets included with the devices. While some conventional technologies exist that do allow a computerized device to obtain entire new font sets, such devices are not able to obtain only portions of a font. Thus, conventional devices are either fully equipped with a font set and can obtain entire new font sets, or such device may only be partially equipped with a font set but are unable to obtain remaining parts of that font.

As an example, a cellular phone cannot dynamically update, or externally retrieve, additional glyphs associated with the font data (e.g., from an external source such as a font server) if the cellular phone were to receive a text message containing data of a particular language that is not recognized by the phone's pre-programmed font set. As a result, the conventional cellular phone or similar device does not properly display the full content of the original text message for lack of sufficient font data. This may not present a large problem in languages such as English that use a relatively compact set of glyphs or symbols (i.e. 26 in the English alphabet) to represent all characters in a particular font. However, as noted above written languages such as Chinese, Japanese and Korean (CJK) may require many thousands of glyphs that can be combined together in various ways to render information in those languages.

Embodiments disclosed herein are based in part, on the observations that multilingual fonts now contain tens of thousands of glyphs that can be used to render information in those fonts. The more glyphs there are in a font, the larger its footprint or storage requirements will be within a device and storage space on mobile devices, due to their compact size, is at a premium. Additionally, the resolution of mobile device displays varies from device to device, but in general display resolution is improving with time and a higher resolution display can accommodate the ability to render more detailed fonts for enhanced readability of the text. In contrast with these observations, even though a font in a CJK language may have tens of thousand of different glyphs for display of information within that font, for most communications, only a fraction of those glyphs are typically required to render most information that people need to communicate in such languages. The remaining glyphs in a given font in such languages are used for only a very small percentage of all communications. For example, a conventional Japanese font set may contain over 23,000 glyphs, almost 15,000 of which are kanji (or ideographs, whereby ideographs typically reference characters of Chinese origin). Out of the roughly 15,000 identifiable ideographs, approximately 3,000 are considered the most common.

As an example to help make the CJK character usage paradigm clearer, only a small fraction of the ideographs in a typical Japanese font are necessary for handling over 98 percent of common usage. For instance, for a large majority of a given CJK population, such as Japan, the 3000 ideographs may handle almost all of their needs (i.e. almost 100 percent). But, due to the nature of ideographs, in that its usage for an *overall* population can never truly reach 100 percent, the system disclosed herein provides a dynamic method to obtain those ideographs that are not commonly used, when needed. For example, even with 15,000 ideographs available to a software program for use in rendering Japanese fonts, the application cannot claim 100 percent coverage for Japanese. Even if a programmer were to increase the number of ideographs to 100,000, 100 percent coverage would still not be attained. It may be very close to 100 percent, perhaps 99.99999998 percent, but the point is that ideographic writing systems have a dynamic nature, whereas alphabetic systems such as the English language alphabet are static. The dynamic nature of language is thus performed at the word level for alphabetic writing systems.

In light of these and similar usage statistics, the system disclosed herein allows a device to store only a portion of all glyphs or font portions (e.g., ideographs) for a given font. In the event that a message arrives at the device and requires rendering using glyphs that are not present in the device, the system enables the device to dynamically obtain those "missing" glyphs to allow full rendition of the message.

More specifically, embodiments disclosed herein significantly overcome the aforementioned deficiencies and provide a computerized device equipped with a message processor that is able to identify situations in which the computerized device is missing font portions or glyphs required for display of message data on a display of the computerized device. Upon recognizing missing font portions, the message processor is able to engage in an exchange with the remote font source to obtain the missing font portions. The exchange allows the computerized device to obtain the missing or required font portions that are necessary to display the entire contents of the message data. This can be performed in real-time to allow dynamic updates to a font data table in the device with missing glyph data. In this manner, the system disclosed herein allows the computerized device such as a cell phone, personal digital assistant, or any other type of computer to be manufactured or otherwise initially configured with a font set that contains fonts for which not all font portions (i.e. glyphs) are present. The initial font set shipped with the device can thus contain less than an entire font set (i.e., one or more fonts with missing glyph portions) and therefore consume less storage space. If a situation arises where a message is required to be rendered with font portions that are not currently present in the device, the device disclosed herein has the capability of retrieving the missing font data portions necessary for rendering the complete message.

Embodiments disclosed herein include a message processor that receives message data from a remote source for rendition to a user of a computerized device. The message data can be any type of data, such as a text message, an email message, a document, web page or any other type of data that needs to be rendered for display to a user of the device. The message processor renders the message data to the user and, during rendering of the message data, identifies that a font in which the message data is to be rendered is missing font portions required to fully render the message data in that font. The term "font portions" refers to any type of symbols, ideographs, glyphs, or other graphical data required to render message data on the display. Missing font portions are those glyphs, for example, that are not presently configured or available within the device, but for which message data is present in the device that, if to be properly rendered, would require those missing font portions. In response, the message processor dynamically obtains the missing font portions for that font to allow the computerized device to fully render the message data in that font. The system is thus able to dynamically obtain just parts of a font, as needed, in any increments and thus a device equipped with this system need not be configured with a font set containing all font portions.

Furthermore, embodiments as disclosed herein include a computerized device configured with font portions that amount to less than an entire set of font portions required to render all symbols of the font. In various embodiments, the font is at least one of a Chinese, Japanese, and Korean font. With these embodiments, the message processor dynamically obtains missing font portions for at least one of a Chinese, Japanese, and Korean font.

In yet another embodiment disclosed herein, the message processor engages in a font portion retrieval protocol with a remote font source, whereby the font portion retrieval protocol identifies message data codes of the received message data for which the font is missing font portions. In this particular embodiment, the font portion retrieval protocol operates in real-time to dynamically obtain the missing font portions during rendering of the message data.

As an example configuration, suppose a cellular phone user receives a text message in a Chinese font on his cellular phone. Further suppose for this example that the user's cellular phone does not have the font portions necessary to render a complete version of the text message in the particular Chinese font. Thus, in accordance with a sample embodiment, the cell phone would request the missing Chinese font portions from a remote font source and, in return, the cellular phone would receive the requested font information to display, in substantially real-time with receiving the original message data, a complete depiction of the message that was originally sent.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
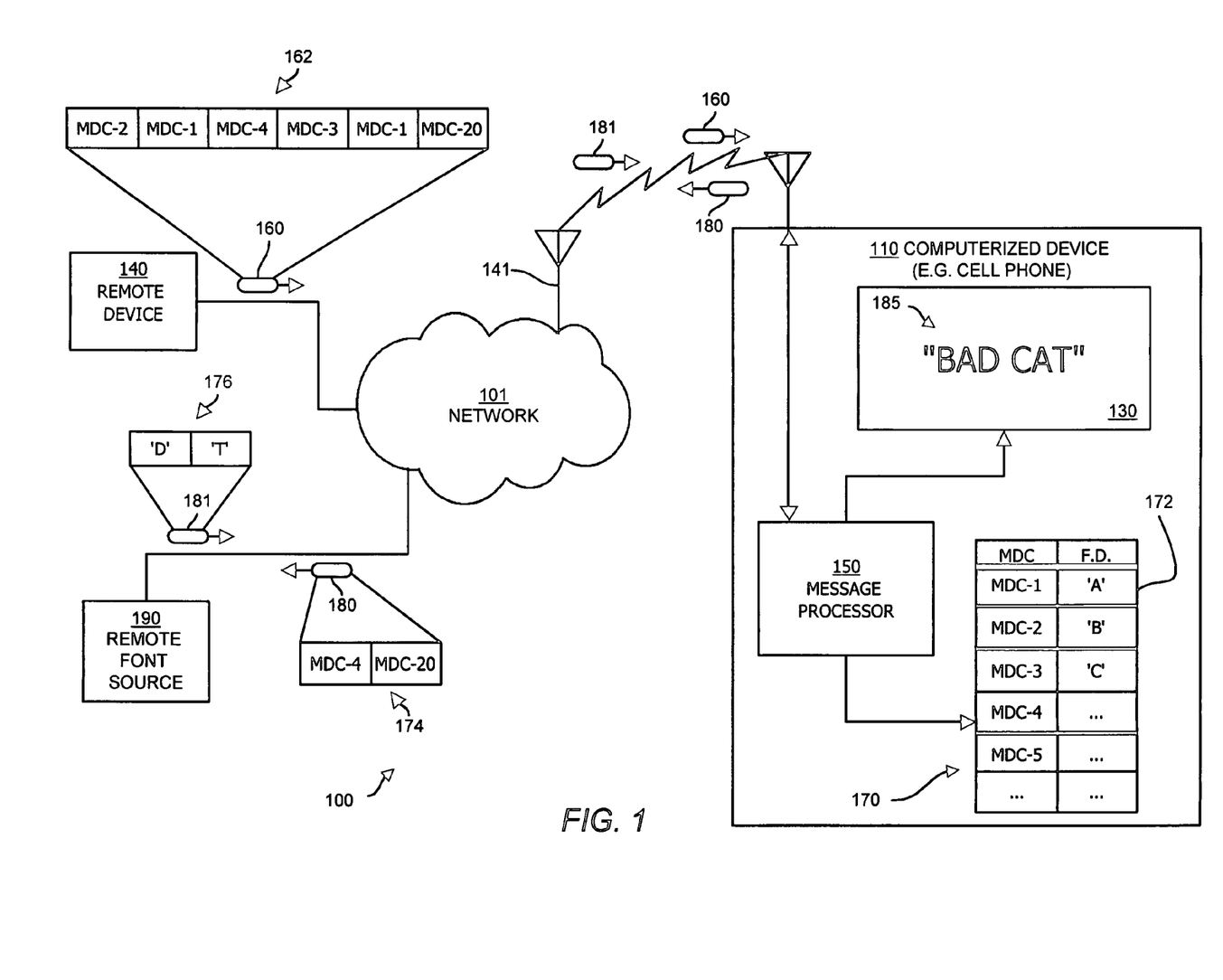
FIG. 1 is a block diagram of a data communications environment including a network that couples a computerized device and a remote font source in accordance with one embodiment of the invention.

FIG. 1 illustrates a data communications environment 100 suitable for use in explaining example embodiments of the invention. The environment 100 includes a network 101 that couples a computerized device 110 and a remote font source 190. The computerized device 110 can be any type of device such as a computer system, workstation, handheld device, cell phone, personal digital assistant or the like. In one configuration, the computerized device 110 is a wireless device and a network 101 is a wireless network. Alternatively, the network 101 may be a physical network such as a local or wide area network or the Internet. In this example, the computerized device 110 includes a message processor 150 configured in accordance with embodiments disclosed herein. Additionally, the computerized device 110 includes a display 130 and a font data table 170. The display 130 may be any type of display mechanism such as a monitor, liquid crystal display or other type of viewable device that a user of the computerized device 110 can view.

Generally, in accordance with configurations disclosed herein, the message processor 150 operates in the computerized device 110 to receive message data 160 as a message over the network 101. The message data 160 may be transmitted from any remote device 140 that communicates with the computerized device 110 using any type of data communications protocol. The message data 160 in this example contains a message in the form of a sequence of message data codes 162 that represent numeric or binary values that the message processor 150 converts into graphical images in order to render the message on the display 130. As an example, the message data 160 may be a text message or other type of message containing character data that the message processor 150 is to render on the display 130.

Upon receipt of the message data 160, the message processor 150 parses the message data 160 using information from the font data table 170 in order to produce a rendered message 185. In performing this process, the font data table 170 provides the message processor 150 with font portions 172, in the form of displayable portions, sometimes referred to in the art as "glyphs" that represent graphical images or pixel arrangements that the message processor 150 can display on the display 130. As an example, for the letter "A" in the English alphabet, the font data table 170 may contain a font portion 172 that can be used to graphically render the representation of "A" on the display 130. In this example, the graphical representation of "A" may be only a single glyph or font portion that happens to correspond to the single character "A". However, in many languages such as Korean, Chinese and Japanese, many thousands of separate font portions or ideographs (as represented by glyphs) may be combinable together to produce individual representations of symbols that have meaning in that language (e.g., word-level objects).

As an example, in the Japanese language there may be as many as 10,000 glyphs that can be used to render ideographs in that language. In such languages, large amounts of memory or other storage may be required to maintain the entire glyph set for a particular language. The embodiments disclosed herein support the ability for a computerized device 110 to contain less than the entire set of font portions or glyphs required for a particular language or font. Using the English language as an easy to understand example, the system disclosed herein enables the computerized device 110 to have less than the entire character set of the English alphabet "A" through "Z". In the example in FIG. 1, the font data table 170 includes font portions 172 for the English alphabet characters 'A', 'B' and 'C'. Note also in this example, however, that the font data table 170 does not include font portions for the characters 'D' through 'Z'. This is done in this example to illustrate that the computerized device 110 contains less than all of the font portions required for a particular font represented in the font data table 170. That is, the font data table 170 contains a set of font portions 172 that are less than the entire set of font portions for a particular font represented by the font data table 170.

Returning to operation of the message processor 150, using the font portions 172 from the font data table 170, the message processor 150 parses or otherwise interprets the message data codes 162 within the received message data 160 in order to produce a rendered message 185 by obtaining the present font portions 172 corresponding to the message data codes 162 within the message data 160. For example, as illustrated in FIG. 1, the message data 160 includes message data codes 162 that correspond to a text message containing the content "BAD CAT". Accordingly, as the message processor 150 parses, interprets or otherwise processes the message data codes 162, the message processor 150 can perform a lookup of message data codes 162 in the font data table 170 in order to retrieve font portions 172 from the font data table 170. However, as discussed above, the font data table 170 in this example does not contain font portions 172 for the characters 'D' through 'Z'.

Using the system disclosed herein, the message processor 150 is able to identify the font portions 172 for the received message 160 that are not included in the font data table 170 and is able to engage in a communications protocol with the remote font source 190 in order to obtain the font portions 172 for inclusion into the font data table 170. In this manner, the system disclosed herein enables a computerized device 110 to obtain font portions 172 that are not present within the device 110 as the device receives message data 160. This allows the computerized device 110 to maintain a font data table 170 that can be substantially smaller than a font data table that would include the entire set of font portions for a given font. As an example, if a font data table 170 included font portions for the Korean, Chinese or Japanese font, the font data table 170 would have to contain a large amount of font portions 172.

This would consume large amounts of memory within the computerized device 110. Using the system disclosed herein, however, the computerized device 110 maintains only a subset of all font portions for a given font within the font data table 170 and can engage in the processing described herein in order to obtain those font portions 172 not included in the font data table that would be required to display a rendered message 185 for message data codes 162 within a given message data 160. The system provides the advantage of having a font data table 170 that consumes far less storage in a computerized device 110 since those font data tables only have to maintain a less significant subset of all font portions 172 for a given font.

The system disclosed herein is based in part on the observation that for certain languages such as Korean, Chinese or Japanese, more than 98 percent of all written or printed material in those languages can be displayed with only a fraction of the thousands, or tens of thousands, of total glyphs or font portions available for those languages. The remaining unused glyphs are only required for a very small percentage of all information to be displayed in those languages. Accordingly, the system disclosed herein can allow a computerized device 110 to be initially equipped or populated with a font data table 170 that only contains a small set of commonly used font portions 172 for that language. In cases where message data 160 is received as message data codes 162 corresponding to unavailable font portions 172 (message data codes for which the device does not currently contain font portions 172), the system is able to dynamically obtain those font portions 172 from the remote font source 190 in real-time so as to be able to render the message data 160. In operation, the previously unavailable font portions 172 that are obtained are integrated into the font data table 170 as will be explained.

Further details of configurations explained herein will now be provided with respect to flow charts of processing steps that show the high level operations disclosed herein performed by the message processor 150.

Figure 2:
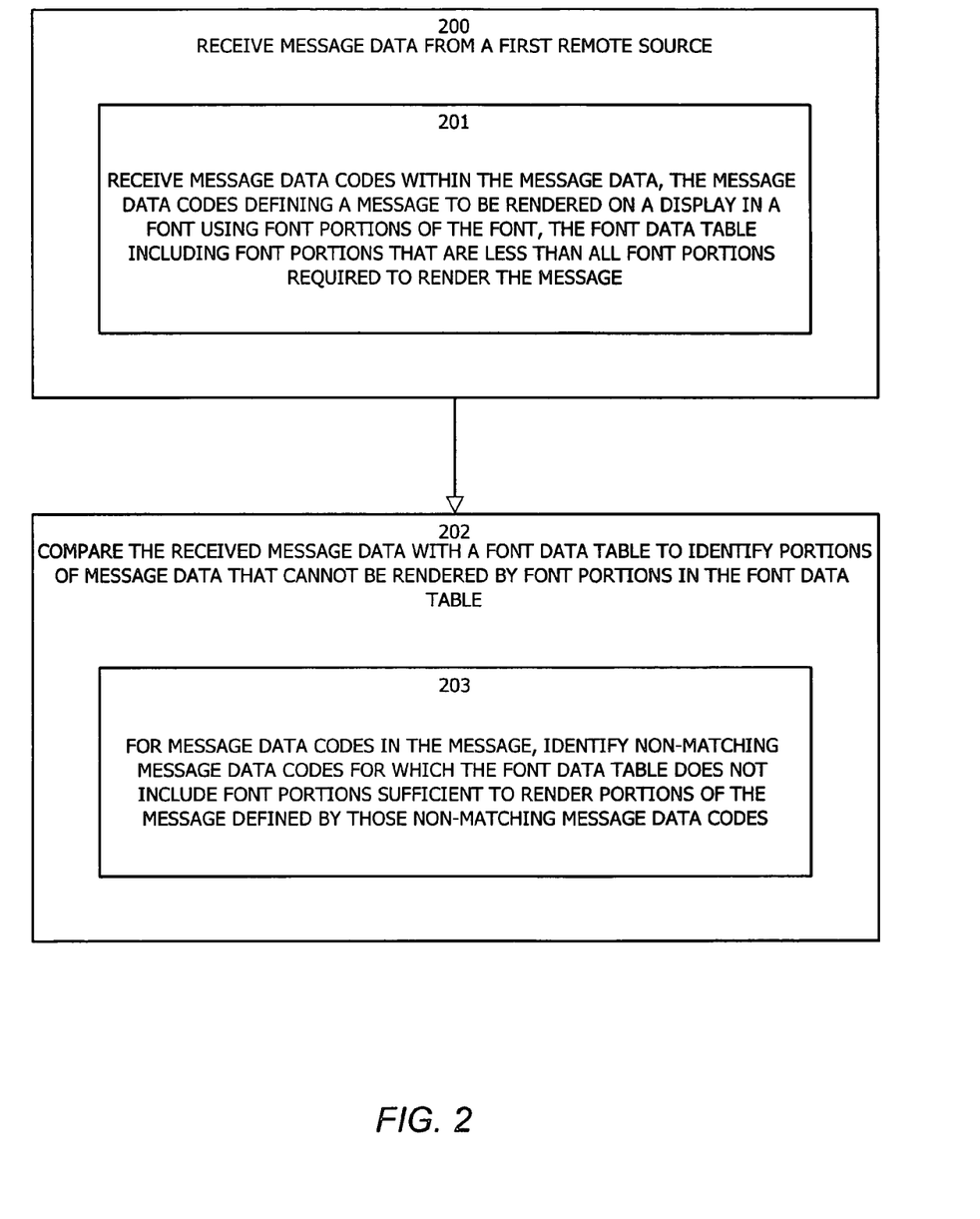
FIG. 2 is a flow chart of processing steps that shows high-level processing operations performed by the message processor when it processes font data in accordance with one example configuration of the invention.

FIG. 2 is a flowchart of processing steps that the message processor 150 performs to process font data in accordance with example embodiments.

In step 200, the message processor 150 receives message data 160 from a remote source 140. As explained in the above example, the remote source 140 (or remote device) may be any type of computerized device (e.g., cellular phone, laptop, PDA, etc.) that performs communication with the computerized device 110 using any type of data communications protocol.

In step 201, the message processor 150 receives message data codes 162 within the message data 160, whereby the message data codes 162 define a message to be rendered on a display 130 in a font using font portions 172 of the font. Moreover, the font data table 170 includes font portions 172 that are less than all font portions required to render the message 185. As an example embodiment, the message data codes 162 may be a text message (e.g., "BAD CAT") transmitted between cellular phones. In this particular example, the message data codes 162 are encoded as binary or numerical values (e.g., as in the ASCII format) such that each message data code 162 corresponds to a font portion 172 of a font. However, in this example configuration the font data table 170 contains less than the required font portions 172 needed to render the entire "BAD CAT" text message on the display 130 of the cellular phone 110.

In step 202, the message processor 150 compares the received message data 160 with a font data table 170 to identify portions of message data 160 that cannot be rendered by font portions 172 in the font data table 170. In this manner, the message processor 150 parses the font data table 170 for available font portions 172 in order to produce a rendered message 185. For example, in one embodiment the message processor 150 receives the text message containing the content "BAD CAT". Assume for this example that the font data table 170 includes only font portions 172 for the English characters 'A', 'B' and 'C' (e.g., MDC-1, MDC-2 and MDC-3, respectively). As a result, the message processor 150 identifies portions of "BAD CAT" that cannot be rendered by font portions 172 in the font data table 170 (characters 'D' and 'T' in this example embodiment).

In step 203, for message data codes 162 in the message, the message processor 150 identifies non-matching message data codes 174 for which the font data table 170 does not include font portions 172 sufficient to render portions of the message defined by those non-matching message data codes 174. Generally, the message processor 150 renders a message with the received message data codes 162 and corresponding font portions 172 in the font data table 170. If, however, non-matching message data codes 174 are identified, the message processor 150 graphically indicates that the rendered message 185 is incomplete. For example, in one configuration the rendered message 185 may insert place-filler symbols (e.g., dashes '-') in the text message to represent the non-matching data codes 174. As in another example embodiment, the message processor 150 renders the message 185 in a different color (e.g., red) on the display 130 to indicate an incomplete message.

With respect to the above-mentioned example, assume that each font portion in the "BAD CAT" text message has a corresponding message data code 162. During processing of the text message, the message processor 150 identifies non-matching message data codes 174. Thus, in this example embodiment the non-matching data codes 174 are the binary representations of the characters 'D' and 'T' (e.g., MDC-4 and MDC-20, respectively) since the font data table 170 does not contain those respective font portions 172.

In step 204, the message processor 150 obtains additional font portions 176 for inclusion into the font data table 170. As will be discussed further in example embodiments, the message processor 150 interacts with a remote font source 190 in order to procure additional font portions 176 for rendering a complete message 185.

Figure 3:
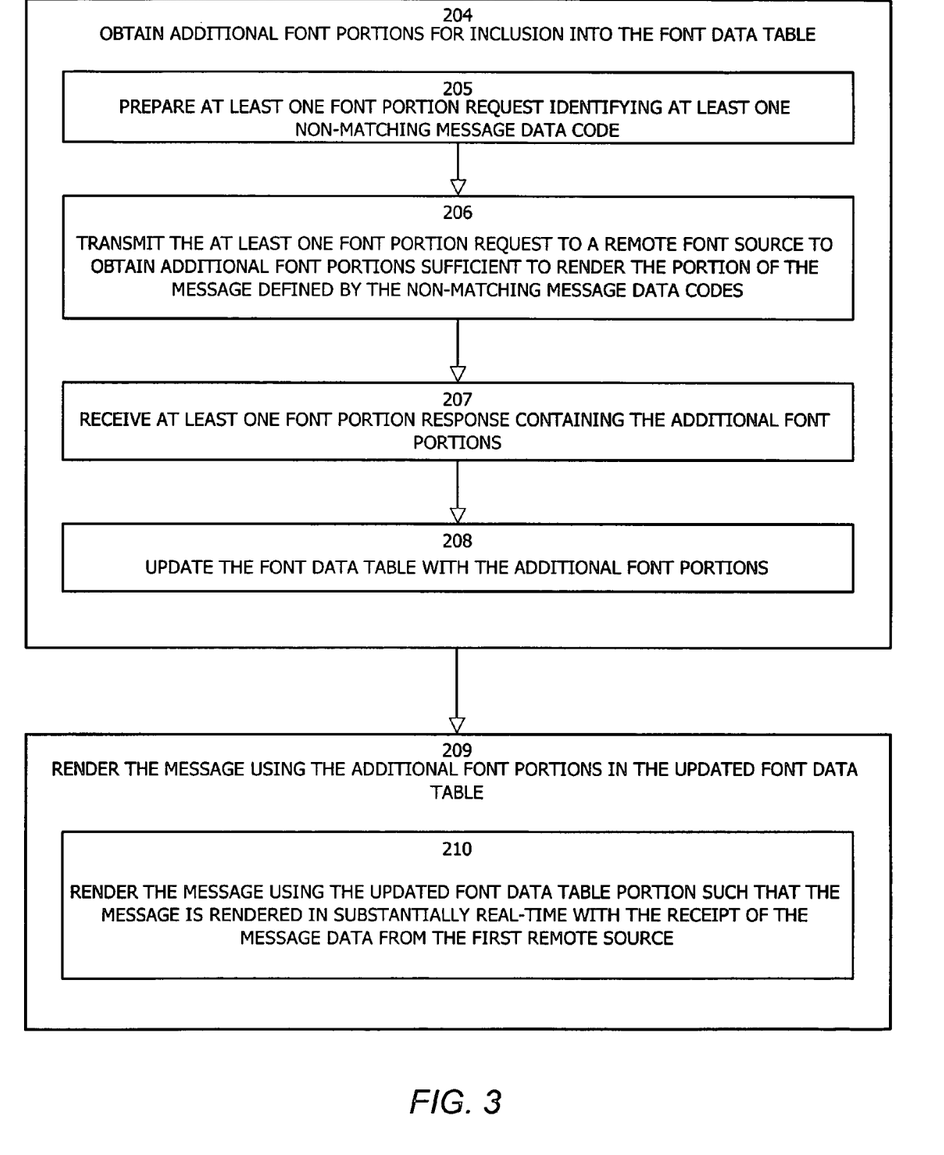
FIG. 3 is a flow chart of processing steps that shows high-level processing operations performed by the message processor when it obtains additional font portions for inclusion into the font data table in accordance with one example configuration of the invention.

FIG. 3 is a flowchart of processing steps that the message processor 150 performs to obtain additional font portions 176 for inclusion into the font data table 170 in accordance with example embodiments.

In step 205, the message processor 150 prepares at least one font portion request 180 identifying at least one non-matching message data code 174. Example embodiments that demonstrate typical communication methods between the message processor 150 and remote font source 190 are discussed below.

In step 206, the message processor 150 transmits the at least one font portion request 180 to a remote font source 190 to obtain additional font portions 176 sufficient to render the portion of the message defined by the non-matching message data codes 174. Generally, for each non-matching data code 174, the message processor 150 prepares a respective font portion request 180 identifying the non-matching message data code 174. In turn, the message processor 150 transmits the respective font portion request 180 to a remote font source 190 to obtain at least one font portion 176 sufficient to render the message 185 defined by the non-matching message data code 174 identified by the respective font portion request 180. For instance, in using the "BAD CAT" example discussed above, the message processor 150 transmits one font portion request 180 for non-matching data code MDC-4 ('D'), and another font portion request 180 for non-matching data code MDC-20 ('T').

In an alternate embodiment, for a plurality of non-matching data codes 174, the message processor 150 prepares a respective font portion request 180 identifying the non-matching message data codes 174. Consequently, the message process 150 transmits the respective font portion request 180 to a remote font source 190 to obtain a plurality of font portions 176 sufficient to render the message 185 defined by the plurality of non-matching message data codes 174 identified by the respective font portion request 180. For instance, in using the "BAD CAT" example once again, the message processor 150 transmits one font portion request 180 that includes both non-matching data code MDC-4 ('D') and non-matching data code MDC-20 ('T').

In step 207, the message processor 150 receives at least one font portion response 181 containing the additional font portions 176. Generally, the message processor 150 performs at least one of the following steps. The first step being that, for each font portion request 180 transmitted to the remote font source 190, the message processor 150 receives a single font portion response 181 containing the font portions 176 sufficient to render the message 185 defined by those message data codes 174. For instance, referring to the "BAD CAT" example previously discussed, in response to a first font portion request 180 for non-matching data code MDC-4 and a second font portion request 180 for non-matching data code MDC-20, the message processor 150 receives a first font portion response 181 ('D') and a second font portion response 181 ('T'), respectively, from the remote font source 190.

Alternatively, the second step is performed such that, for a set of font portion requests 180 transmitted to the remote font source 190, the message processor 150 receives a single font portion response 181 containing the font portions 176 sufficient to render the message 185 defined by those message data codes 174. For instance, referring to the "BAD CAT" example once again, in response to a first font portion request 180 for non-matching data code MDC-4 and a second font portion request 180 for non-matching data code MDC-20, the message processor 150 receives a single font portion response 181 from the remote source 190 containing both font portions 176 ('D' and 'T') necessary to render the message 185 ("BAD CAT").

In step 208, the message processor 150 updates the font data table 170 with the additional font portions 176. According to one example embodiment, the font data table 170 includes all of the message data codes 162 for a particular font even in the absence of corresponding font portions 172 not included in the font data table 170. In this case, the message processor 150 needs only to update the font portions 172 in the font data table 170. Alternatively, in another sample embodiment the font data table 170 includes only those message data codes 162 for a particular font that have corresponding font portions 172 that are present in the font data table 170. In this particular embodiment, the message processor 150 updates both the font portions 172 and the message data codes 162 upon receipt of a font portion response 181 from the remote font source 190. It should be noted that in an alternate hybrid embodiment, the font data table 170 includes less than all message data codes 162 for a particular font such that some of the message data codes 162 do not have corresponding font portions 172 present in the font data table 170. In such a configuration, the message processor 150 may or may not update the message data codes 162 in the font data table 170 upon receipt of a font portion response 181 from the remote font source 190 depending on whether the font data table 170 already includes the message data code(s) 162 contained in the font portion response 181. As such, the message processor 150 would update the font data table with additional message data codes 162 if the font data table 170 did not already include those additional message data codes.

In step 209, the message processor 150 renders the message using the additional font portions 176 in the updated font data table 170. At a basic level, the message processor 150 renders the complete message (original message including additional font portions) in memory such that the message may be graphically rendered on a display 130 or accessed by another process (e.g., data logging process). Likewise, in addition to rendering the message using the additional font portions 176 in memory, the message processor 150 may also graphically render the message on a display 130. In this regard, the display may be located locally (e.g., on the communications device such as a cellular phone display) or remotely (e.g., a display attached to a separate device across a network). In an additional embodiment, the message may be rendered in an audible fashion such that a computer-generated voice recites the completed message. The audible rendition of the message may be implemented in addition to, or in lieu of the graphical rendition of the message.

In step 210, the message processor 150 renders the message using the updated font data table 170 such that the message is rendered in substantially real-time with the receipt of the message data 160 from the remote source 140. In other words, substantial real-time processing occurs if the dynamic processing steps of requesting and retrieving additional font data 176, as described herein, are transparent to a user receiving message data 160 on a device such that the user is unaware of the additional processing steps when viewing the rendered message 185.

Figure 4:
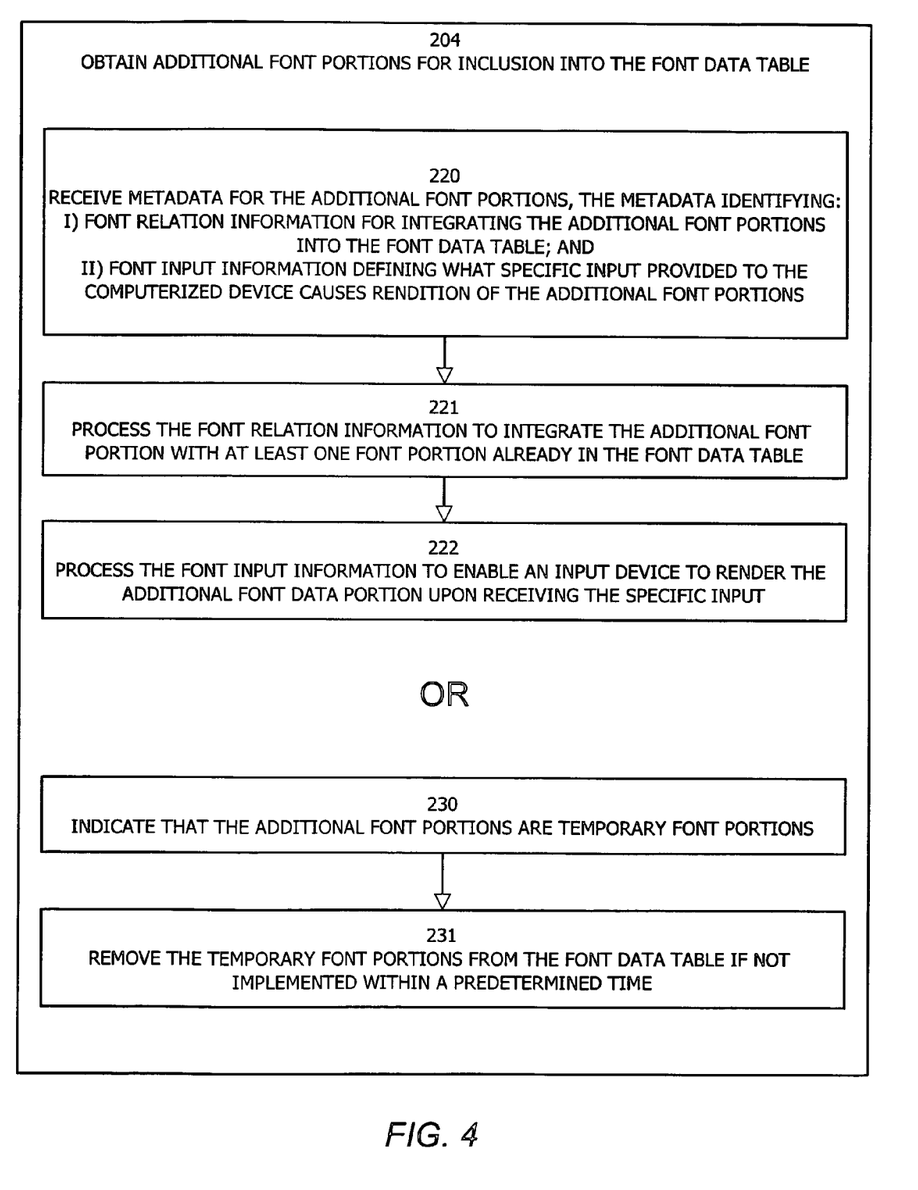
FIG. 4 is a flow chart of processing steps that shows high-level processing operations performed by the message processor when it obtains additional font portions for inclusion into the font data table in accordance with one example configuration of the invention.

FIG. 4 is a flowchart of processing steps that the message processor 150 performs to obtain additional font portions 176 for inclusion into the font data table 170 in accordance with example embodiments.

In step 220, the message processor 150 receives metadata for the additional font portions 176. According to an example embodiment, the metadata identifies, i) font relation information for integrating the additional font portions 176 into the font data table 170; and, ii) font input information defining what specific input provided to the computerized device 110 causes rendition of the additional font portions 176. In various embodiments, the metadata received in the font portion response 181 may be specific to one or more additional font portions 176 depending on the particular font portions that were requested by the message processor 150. For instance, if a plurality of additional font portions 176 have similar attributes in relation to one another, the metadata received in the font portion response 181 may contain information pertaining to the collective group of additional font portions 176. Alternatively, the metadata may pertain to individual additional font portions 176 that are included in the font portion response 181.

In step 221, the message processor 150 processes the font relation information to integrate the additional font portion 176 with at least one font portion 172 already in the font data table 170. As is typical in ideographical fonts (e.g., relating to the Chinese, Japanese and Korean languages), font portions 172, or glyphs, are often combined to form a representation of the intended graphical depiction of the message (e.g., a word-level object). Thus, as in one example embodiment, the message processor 150 combines font portions 172 already included in the font data table 170 with the received additional font portions 176 to produce a representation of the intended graphical depiction of the message.

In step 222, the message processor 150 processes the font input information to enable an input device to render the additional font portion 176 upon receiving the specific input. In order for a user to reproduce the additional font portion(s) (or parent font portion(s) as previously discussed), the metadata provides font input information that instructs an input device on how to render the additional font portion(s) 176 (or parent font portions) upon receiving the specific user or process input. For example, in one embodiment the font input information contains instructions for rendering an additional font portion 176 by way of entering specific keys on a keyboard device.

In step 230, the message processor 150 indicates that the font portions 176 received from the remote font source 190 are temporary font portions. In essence, by labeling the font portions 176 that are received from the remote font source 190 as 'temporary' font portions, the message processor 150 can distinguish between font portions that were pre-programmed into the computerized device 110 and font portions that were subsequently received in a font portion response 181.

In step 231, the message processor 150 removes the temporary font portions from the font data table 170 if not implemented within a predetermined time. In other words, the message processor 150 performs data and memory management operations by removing temporary font portions that are not frequently used. For example, in one embodiment the message processor 150 removes temporary font portions that have not been implemented in ten days.

Figure 5:
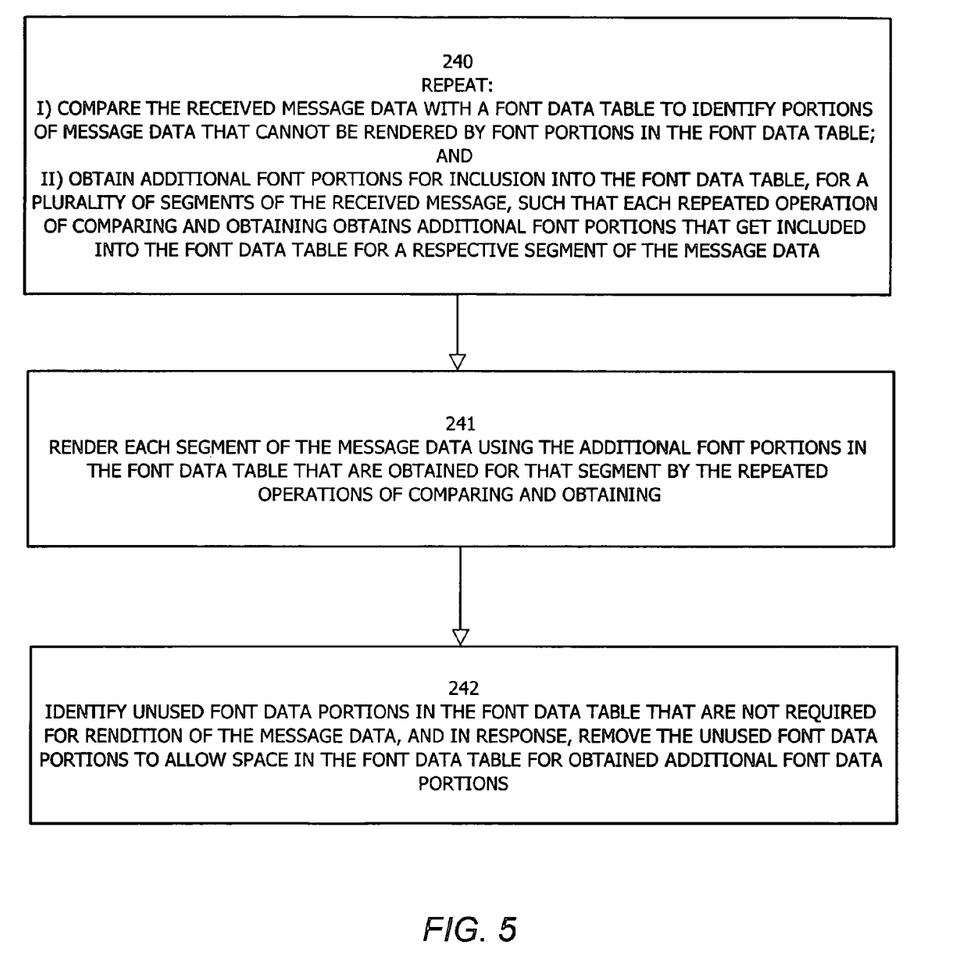
FIG. 5 is a flow chart of processing steps that shows high-level processing operations performed by the message processor when it processes font data in accordance with one example configuration of the invention.

FIG. 5 is a flowchart of processing steps that the message processor 150 performs to process font data in accordance with example embodiments. In step 240, the message processor 150 repeats the following steps:
  i) comparing the received message data 160 with a font data table 170 to identify portions of message data that cannot be rendered by font portions 172 in the font data table 170; and
  ii) obtaining additional font portions 176 for inclusion into the font data table 170, for a plurality of segments of the received message, such that each repeated operation of comparing and obtaining obtains additional font portions 176 that get included into the font data table 170 for a respective segment of the message data 160.

In accordance with the "BAD CAT" example as explained above, assume that the font data table 170 includes only message data codes 162 and corresponding font portions 172 for the English characters 'A', 'B' and 'C'. Further assume that the message processor 150 transmits a font portion request 180, if necessary, after every three font portions 172 that are received from the original message data 160. Thus, in operation, after receiving the first three font portions (e.g., 'B' 'A' and 'D', respectively) in the original "BAD CAT" message and comparing the font portions 172 with the font data table 170, the message processor 150 obtains additional font portions 176 by transmitting a font portion request 180 for the character 'D'. Similarly, the message processor 150 transmits a font portion request 180 for the character 'T' after receiving and comparing the second set of three font portions (e.g., 'C' 'A' and 'T', respectively) from the original "BAD CAT" message.

In step 241, the message processor 150 renders each segment of the message data 160 using the additional font portions 176 in the font data table 170 that are obtained for that segment by the repeated operations of comparing and obtaining.

In step 242, the message processor identifies unused font data portions 172 in the font data table 170 that are not required for rendition of the message data 160, and in response, removing the unused font data portions 172 to allow space in the font data table 170 for obtained additional font data portions 176. For purposes of data and memory management, the message processor 150 frees memory space by removing font portions 172 that are not frequently used in rendering an incoming message and/or are not frequently implemented by a user or process.

Figure 6:
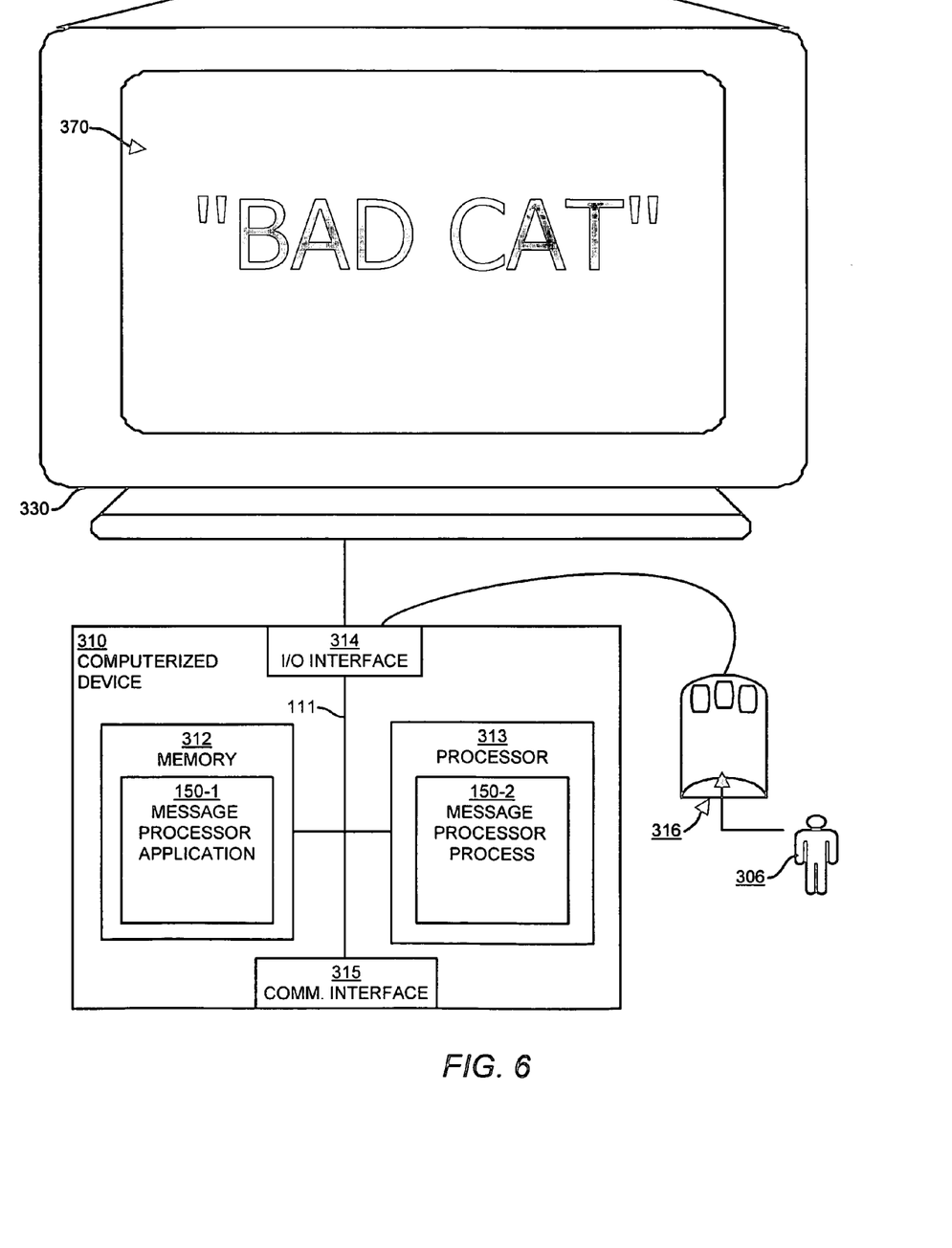
FIG. 6 is a block diagram of a computerized system configured with a message processor application including a message processor process in accordance with one embodiment of the invention.

FIG. 6 is a block diagram illustrating an example architecture of a computer system 310 that executes, runs, interprets, operates or otherwise performs a message processor application 150-1 and process 150-2. The computer system 310 may be any type of computerized device such as a personal computer, workstation, portable computing device, console, laptop, network terminal or the like. As shown in this example, the computer system 310 includes an interconnection mechanism 311 such as a data bus or other circuitry that couples a memory system 312, a processor 313, an input/output interface 314, and a communications interface 315. An input device 316 (e.g., one or more user controlled devices such as a keyboard, mouse, stylus etc.) couples to processor 313 through I/O interface 314, and enables a user 308 to provide input commands and generally control the content that the message processor application 150-1 and process 150-2 provides on the display 330. The communications interface 315 enables the computer system 310 to communicate with other devices (i.e., other computers, laptops, cellular phones, PDA's, etc.) on a network (not shown).

The memory system 312 is any type of computer readable medium and in this example is encoded with a message processor application 150-1. The message processing application 150-1 may be embodied as software code such as data and/or logic instructions (e.g., code stored in the memory or on another computer readable medium such as a removable disk) that supports processing functionality according to different embodiments described herein. During operation of the computer system 310, the processor 313 accesses the memory system 312 via the interconnect mechanism 311 in order to launch, run, execute, interpret or otherwise perform the logic instructions of the message processing application 150-1. Execution of the message processing application 150-1 in this manner produces processing functionality in a message processing process 150-2. In other words, the message processing process 150-2 represents one or more portions of runtime instances of the message processing application 150-1 (or the entire application 150) performing or executing within or upon the processor 313 in the computerized device 310 at runtime.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:
1. A computer-implemented method comprising:
  storing, at a computerized device, a limited set of font portions, wherein the limited set of font portions is less than an entire set of font portions required to render all symbols of a font;
  receiving a message at the computerized device from a remote source, wherein the message comprises message data codes that represent values that can be converted into graphical images in order to render the message, wherein the message data codes correspond to font portions of the entire set of fonts;

identifying, via the computerized device, a non-matching message data code of the message data codes by comparing the message data codes with the limited set of font portions, wherein the limited set of font portions does not have a font portion corresponding to the non-matching message date code;

sending a request from the computerized device to a resource over a network, the request requesting an additional font portion corresponding to the non-matching message data code; and initiating, via the computerized device, display of a visual representation of the message.

2. The method of claim 1 wherein display of the visual representation is based at least in part on the limited set of font portions and the additional font portion.

3. The method of claim 1 wherein display of the visual representation comprises a graphical indication that rendering of the message is incomplete.

4. The method of claim 3 wherein the graphical indication comprises a place-filler symbol to represent the non-matching message data code.

5. The method of claim 1 further comprising updating the limited set of font portions by adding the additional font portion.

6. The method of claim 5 further comprising removing the additional font portion from the limited set of font portions if the additional font portion is not used within a predetermined time.

7. The method of claim 5 further comprising removing the additional font portion from the limited set of font portions to allow for obtaining additional font data portions.

8. The method of claim 1 wherein the request comprises the non-matching message data code.

9. The method of claim 1 wherein the message is displayed in substantially real-time with receiving the message from the remote source.

10. The method as in claim 1 wherein the entire set of font portions comprises glyphs that can be combined to render information in Chinese, Japanese, or Korean, wherein the limited set of font portions comprises glyphs that are more commonly used than glyphs that are not included in the limited set of font portions.

11. A non-transitory computer-readable medium comprising:

program code for storing, at a computerized device, a limited set of font portions, wherein the limited set of font portions is less than an entire set of font portions required to render all symbols of a font;

program code for receiving a message at the computerized device from a remote source, wherein the message comprises message data codes that represent values that can be converted into graphical images in order to render the message, wherein the message data codes correspond to font portions of the entire set of fonts;

program code for identifying, via the computerized device, a non-matching message data code of the message data codes by comparing the message data codes with the limited set of font portions, wherein the limited set of font portions does not have a font portion corresponding to the non-matching message date code;

program code for sending a request from the computerized device to a resource over a network, the request requesting an additional font portion corresponding to the non-matching message data code; and initiating, via the computerized device, display of a visual representation of the message.

12. The computer-readable medium of claim 11 wherein display of the visual representation is based at least in part on the limited set of font portions and the additional font portion.

13. The computer-readable medium of claim 11 wherein display of the visual representation comprises a graphical indication that rendering of the message is incomplete.

14. The computer-readable medium of claim 13 wherein the graphical indication comprises a place-filler symbol to represent the non-matching message data code.

15. The computer-readable medium of claim 11 further comprising program code for comprising updating the limited set of font portions by adding the additional font portion.

16. The computer-readable medium of claim 15 further comprising program code for removing the additional font portion from the limited set of font portions if the additional font portion is not used within a predetermined time.

17. The computer-readable medium of claim 15 further comprising program code for removing the additional font portion from the limited set of font portions to allow for obtaining additional font data portions.

18. The computer-readable medium of claim 11 wherein the request comprises the non-matching message data code.

19. The computer-readable medium of claim 11 wherein the message is displayed in substantially real-time with receiving the message from the remote source.

20. The computer-readable medium of claim 11 wherein the entire set of font portions comprises glyphs that can be combined to render information in Chinese, Japanese, or Korean, wherein the limited set of font portions comprises glyphs that are more commonly used than glyphs that are not included in the limited set of font portions.

* * * * *